(12) United States Patent
Chen (10) Patent No.: US 6,951,471 B1
(45) Date of Patent: Oct. 4, 2005

(54) ELECTRONIC CARD CONNECTOR (75) Inventor: Yen-Hung Chen, Hsintien (TW)

(73) Assignee: Jess-Link Products Co., Ltd., Taipei (TW)

( * ) Notice: Subject to any disclaimer, the term of this patent is extended or adjusted under 35 U.S.C. 154(b) by 0 days.

(21) Appl. No.: 10/972,387

(22) Filed: Oct. 26, 2004

(51) Int. Cl.[7] .............................................. H01R 13/62
(52) U.S. Cl. ..................................... 439/159; 439/159
(58) Field of Search .......................... 439/159, 64, 607, 439/630

(56) References Cited

U.S. PATENT DOCUMENTS

| | | | |
|---|---|---|---|
| 6,394,843 B1 * | 5/2002 | Chang et al. ................ | 439/607 |
| 6,478,591 B1 * | 11/2002 | Chang ........................ | 439/159 |
| 6,663,403 B2 * | 12/2003 | Hsu ............................ | 439/159 |
| 6,685,490 B1 * | 2/2004 | Xue et al. .................... | 439/159 |
| 6,692,277 B2 * | 2/2004 | Hu et al. ..................... | 439/188 |
| 6,722,921 B1 * | 4/2004 | Yu .............................. | 439/573 |
| 6,746,256 B1 * | 6/2004 | Wang ......................... | 439/159 |
| 6,764,327 B2 * | 7/2004 | Yu ............................. | 439/188 |
| 6,802,726 B2 * | 10/2004 | Chang ........................ | 439/159 |
| 6,814,596 B2 * | 11/2004 | Yu et al. ...................... | 439/159 |
| 2005/0006389 A1 * | 1/2005 | Emmerzaal .................. | 220/269 |

* cited by examiner

Primary Examiner—Gary Paumen
Assistant Examiner—Larisa Tsukerman
(74) Attorney, Agent, or Firm—Rosenberg, Klein & Lee (57) ABSTRACT An electrical card connector includes an insulative housing, an ejector and a shield casing. The insulative housing includes an insertion space formed therein, and a guiding groove. The ejector includes a sliding element and an auxiliary terminal. The sliding element has a guiding block projected from a bottom side thereof. The guiding block is installed slidably in the guiding groove. The auxiliary terminal is disposed slidably in the sliding element. The auxiliary terminal has a guiding piece. The shield casing covers the insulative housing, and has a concave portion received in the insertion space. The shield casing has a guiding track parallel to the guiding groove of the insulative housing, wherein the guiding piece is installed slidably in the guiding track. As such, the sliding element can be moved smoothly into the guiding groove and the electronic card can be smoothly inserted into or ejected from the insulative housing.

13 Claims, 11 Drawing Sheets

ELECTRONIC CARD CONNECTOR

BACKGROUND OF THE INVENTION

1. Field of the Invention

The present invention relates to an electronic card connector, and particularly relates to an electronic card connector for accommodating an electronic card, and a device which ejects the electronic card from the electronic card connector when the card is pushed.

2. Description of the Related

Figure 1:
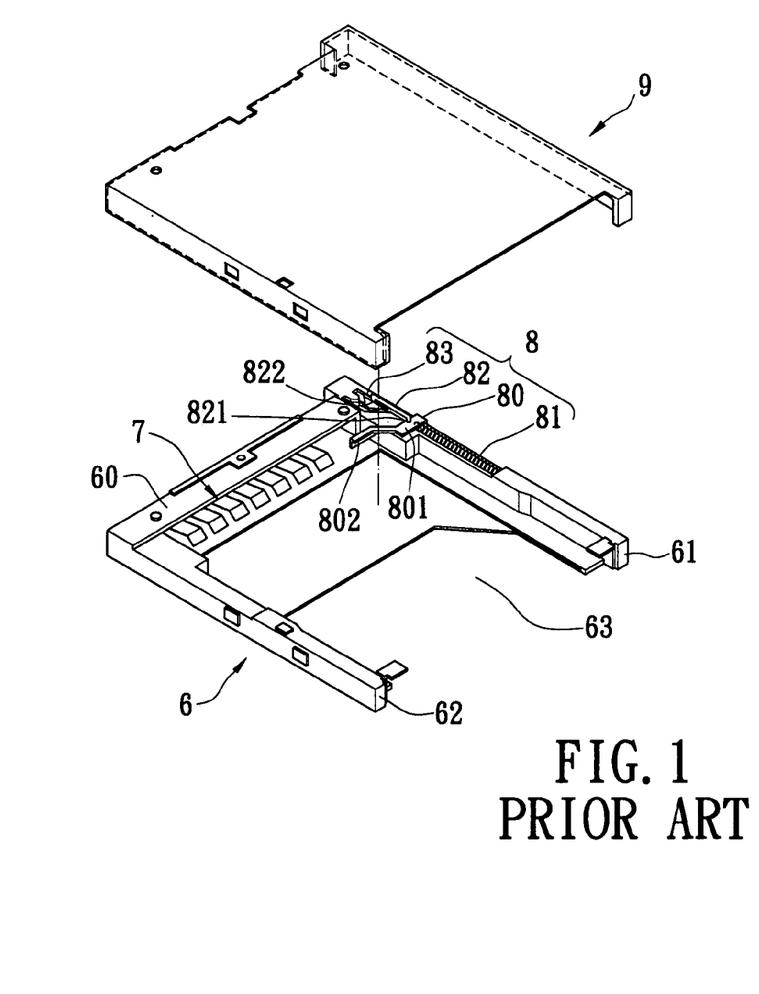
FIG. 1 is a perspective, exploded view of the electrical card connector of the prior art.

Small electronic cards with a large memory are nowadays regularly used with many kinds of portable electrical products, for example, cell phones, digital cameras and PDAs. The electrical product has a PCB and an electrical card connector fixed on the PCB for accommodating an electronic card and electrically connecting it to the conductive terminals of the electronic card. The electrical card connector further includes an ejector for ejecting the electronic card that is accommodated in the electrical card connector. Because the electronic card is frequently inserted and ejected from the electrical card connector, the electrical card connector must be durable enough to ensure the smooth insertion and ejection of the electronic card from the electrical card connector so no damage is caused, thus avoiding the situation where the electrical card connector fails to connect with the electronic card. Hence the conductive terminals of the electrical card connector and the electronic card are electrically connected to each other. Referring to FIG. 1, the electrical card connector of the prior art is used to accommodate an electronic card (not shown), comprising an isolative housing 6, a conductive terminal 7, an ejector 8 and a shield casing 9. The isolative housing 6 has a base portion 60, a first arm 61 and a second arm 62. The first arm 61 and the second arm 62 are connected parallel to two sides of the base portion 60. The isolative housing 1 further includes an insertion space 63. The conductive terminal 7 is arranged on the base portion 60 of the isolative housing 6. The ejector 8 has a sliding element 80, an elastic element 81, a guiding element 82 and a track groove 83. The track groove 83 is formed on the first arm 61 and adjacent to the base portion 60. The sliding element 80 has a sliding portion 801 disposed slidably on the first arm 61 and a pushed arm 802 inserted into the insertion space 63. The elastic element 81 is installed between the first arm 61 and the sliding element 80. One side of the guiding element 82 is a pivot side 821 and the other side of the guiding element 82 is a guiding side 822. The pivot side 821 is connected pivotally to the sliding portion 801 of the sliding element 80, and the guiding side 822 is received movably in the track groove 83. The shield casing 9 covers the isolative housing 6 for clamping the sliding portion 801 between the first arm 61 and shield casing 9.

When the electronic card is inserted into the insertion space 63, one side of the electronic card pushes the pushed arm 802 of the sliding element 80 and the elastic element 81 extends to move the guiding side 822 of the guiding element 82. It is thereby positioned in the track groove 83 completing the inserting action. When the electronic card is pushed again, the guiding side 822 of the guiding element 82 is released from the track groove 83 and the elastic element 80 pulls the sliding element 80 back for the push arm 802 which ejects the electronic card from the electrical card connector to complete the ejecting action. Because the sliding portion 801 of the sliding element 80 is only clamped between the first arm 61 and the shield casing 9, the sliding element 80 easily swung and rubbed. As such the electronic card cannot be smoothly inserted into or ejected from the electrical card connector, causing damage to the electrical connection between the electronic card and the conductive terminal 7.

With the employment of unique considerations and application of theories, and based on several years experience in specialized production of all flexible assembly systems and mechanisms, the inventor has come up with an innovative electrical card connector.

SUMMARY OF THE INVENTION

The main objective of the present invention is to provide an electrical card connector in which the electronic card can be smoothly inserted into or ejected from the electrical card connector.

The secondary objective of the present invention is to provide an electrical card connector in which the electronic card firmly inserts into the electrical card connector for increasing the conductivity between the electronic card and the conductive terminal of the electrical card connector.

In order to achieve the above objectives, the present invention provides an electronic card connector, comprising an insulative housing, an ejector and a shield casing.

The insulative housing includes an insertion space formed therein, and a guiding groove. The ejector includes a sliding element and an auxiliary terminal. The sliding element has a guiding block projected from a bottom side thereof. The guiding block is installed slidably in the guiding groove, and the auxiliary terminal is disposed slidably in the sliding element. The auxiliary has a guiding piece. The shield casing covers the insulative housing, and has a concave portion received in the insertion space. The shield casing has a guiding track parallel to the guiding groove of the insulative housing, wherein the guiding piece is installed slidably in the guiding track.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objectives and advantages of the present invention will be more readily understood from the following detailed description when read in conjunction with the appended drawings, in which.

DETAILED DESCRIPTION OF PREFERRED EMBODIMENTS

Figure 2:
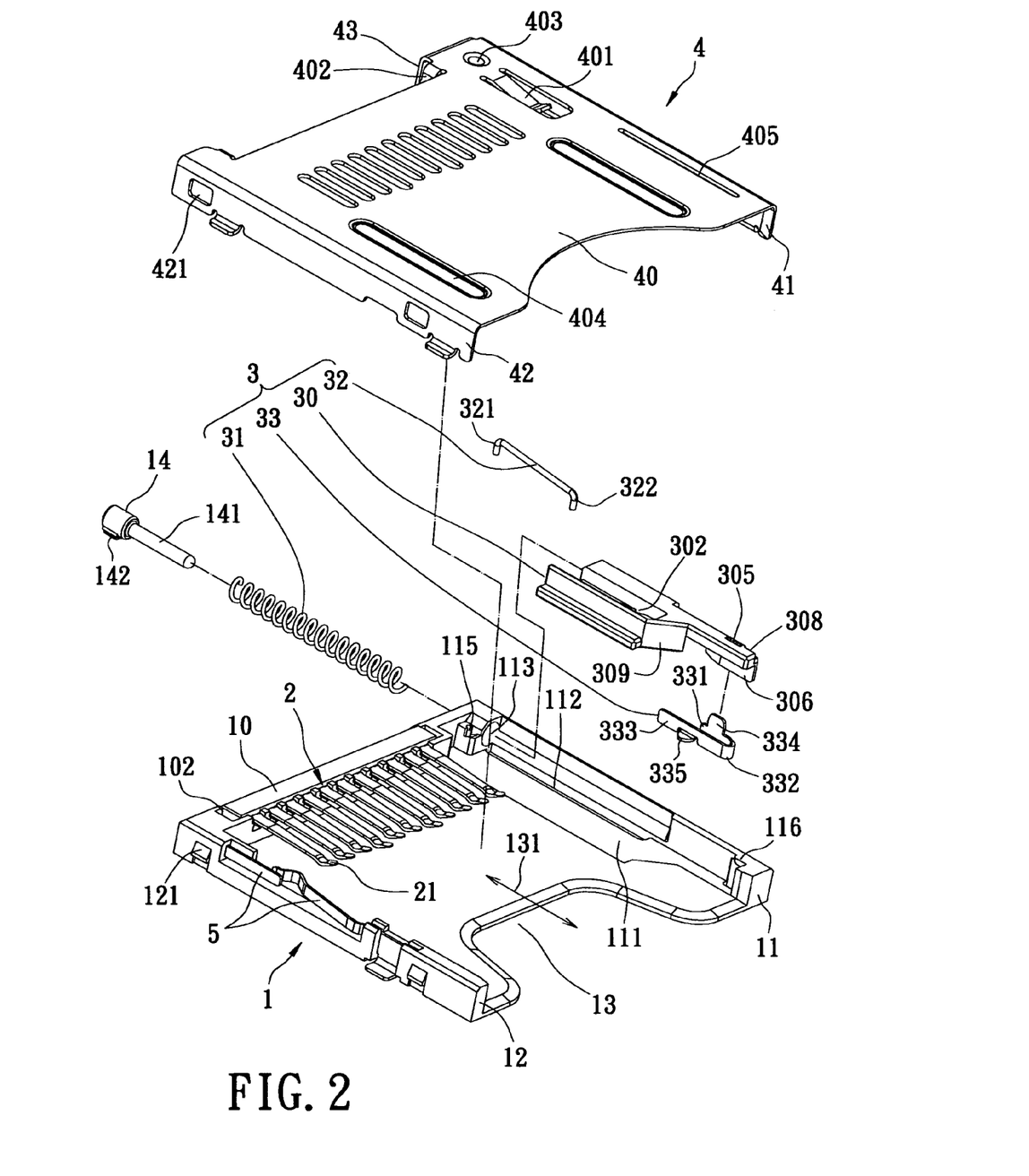
FIG. 2 is a first perspective, exploded view of the electrical card connector of the present invention.
Figure 3:
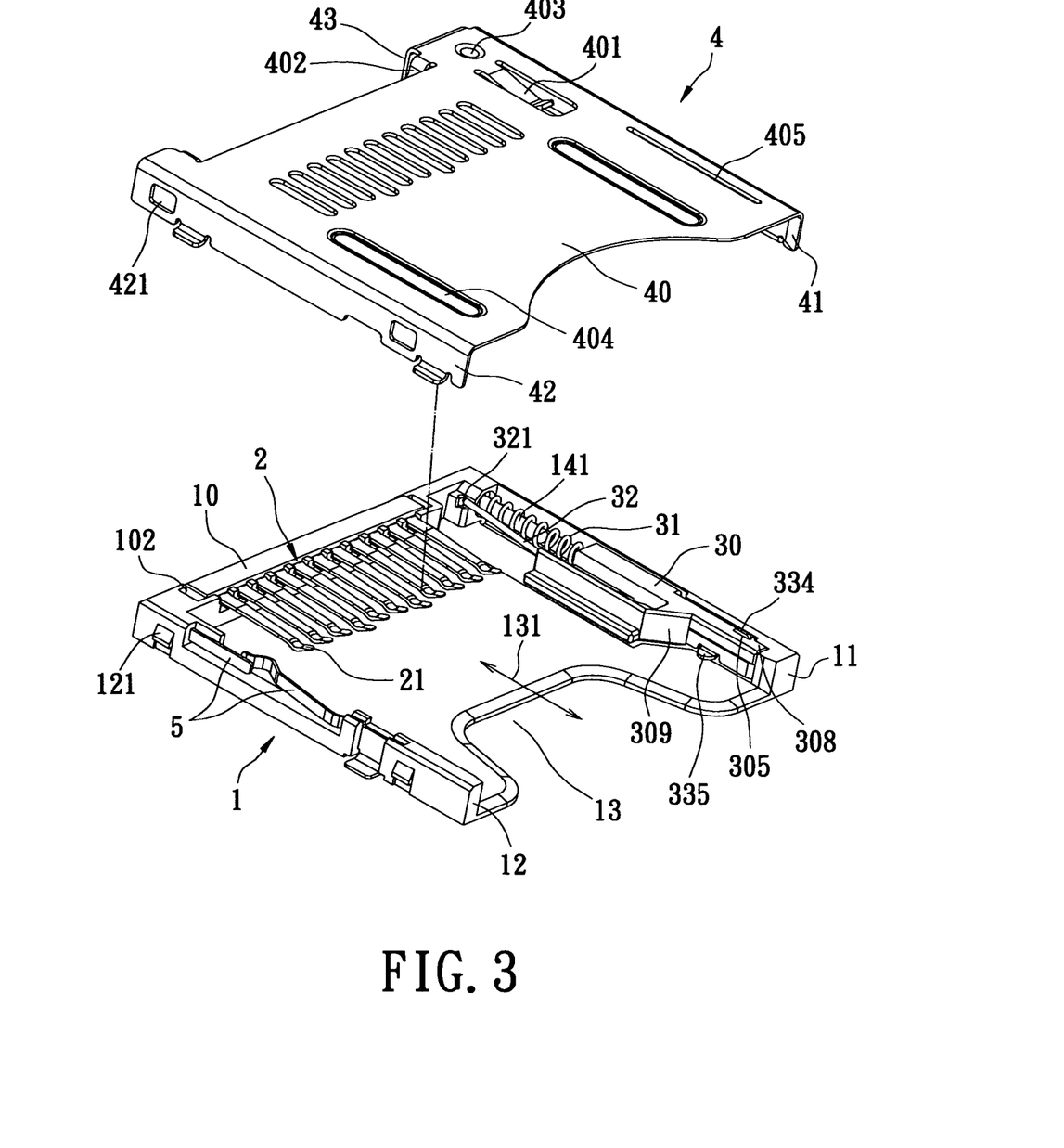
FIG. 3 is a first perspective, assembled view of the electrical card connector of the present invention.
Figure 4:
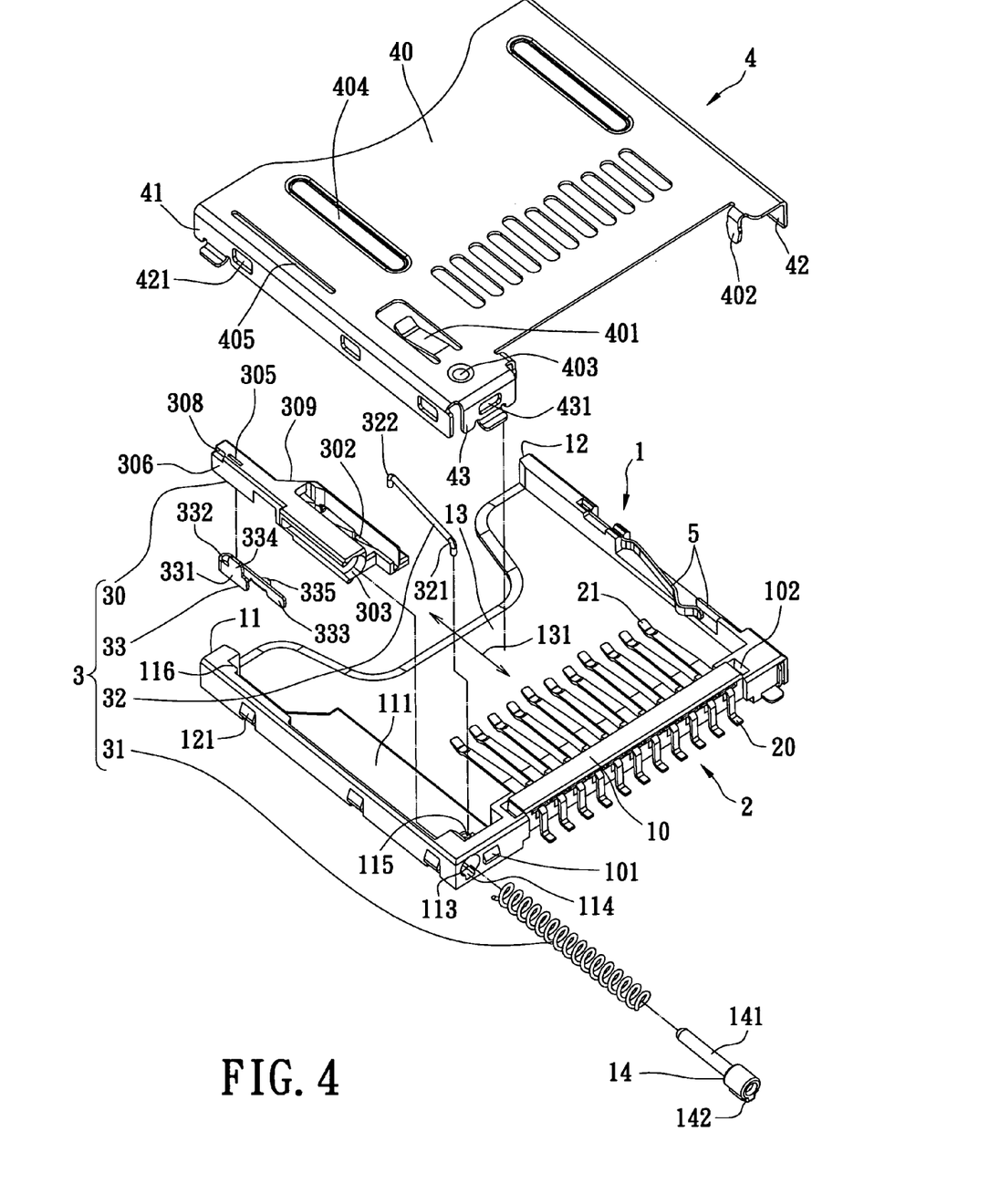
FIG. 4 is a second perspective, exploded view of the electrical card connector of the present invention.
Figure 5:
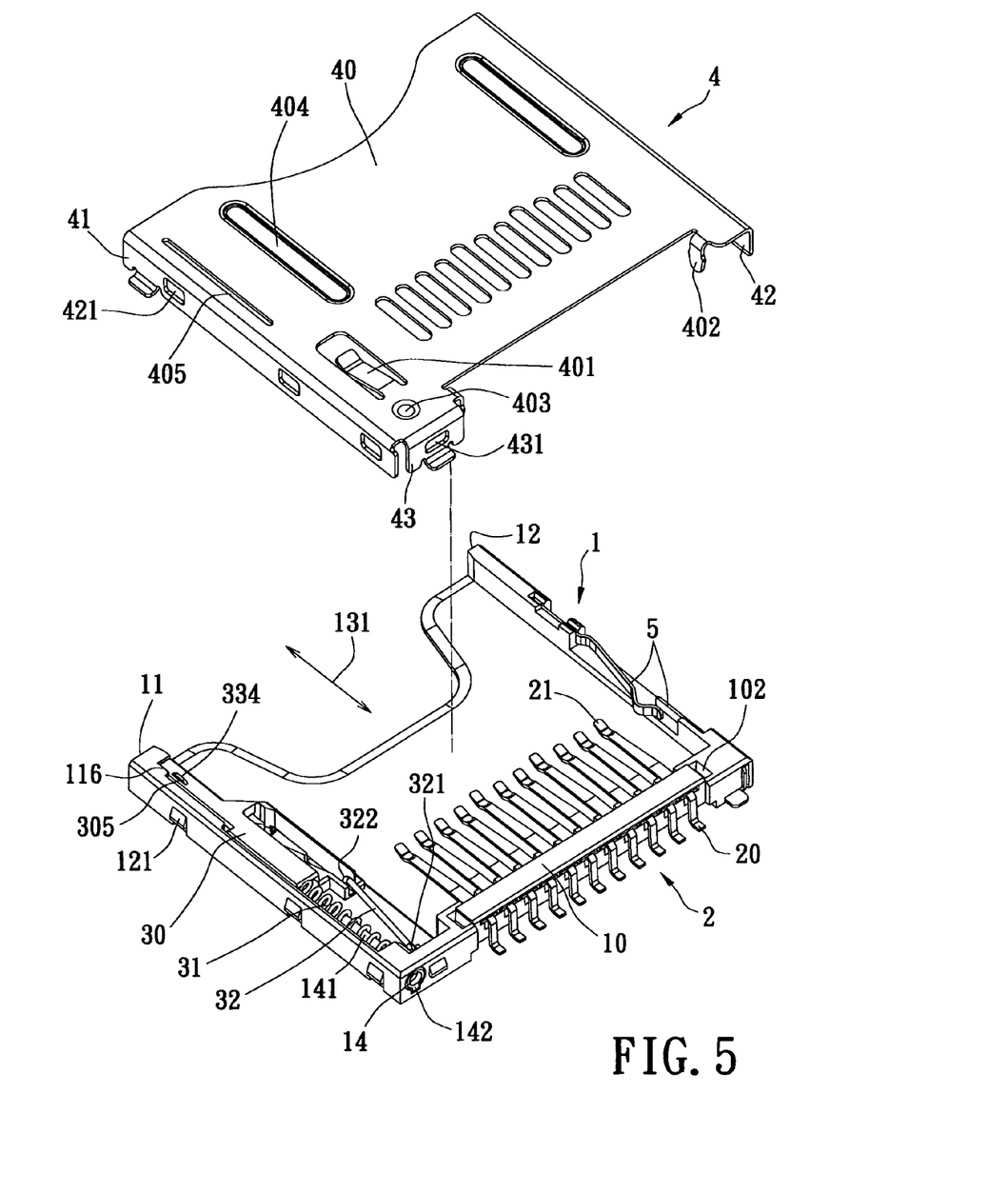
FIG. 5 is a second perspective, assembled view of the electrical card connector of the present invention.
Figure 6:
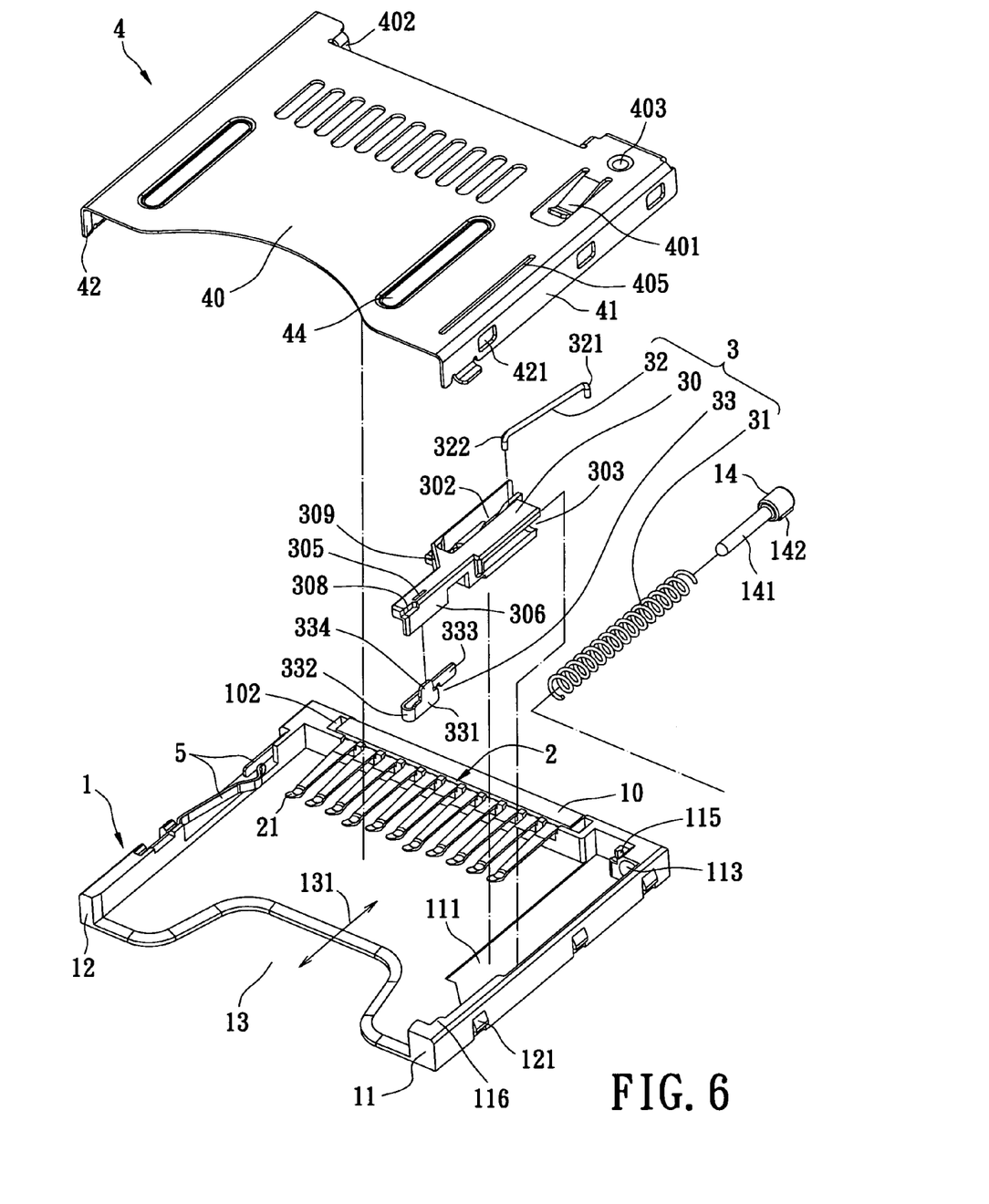
FIG. 6 is a third perspective, exploded view of the electrical card connector of the present invention.
Figure 7:
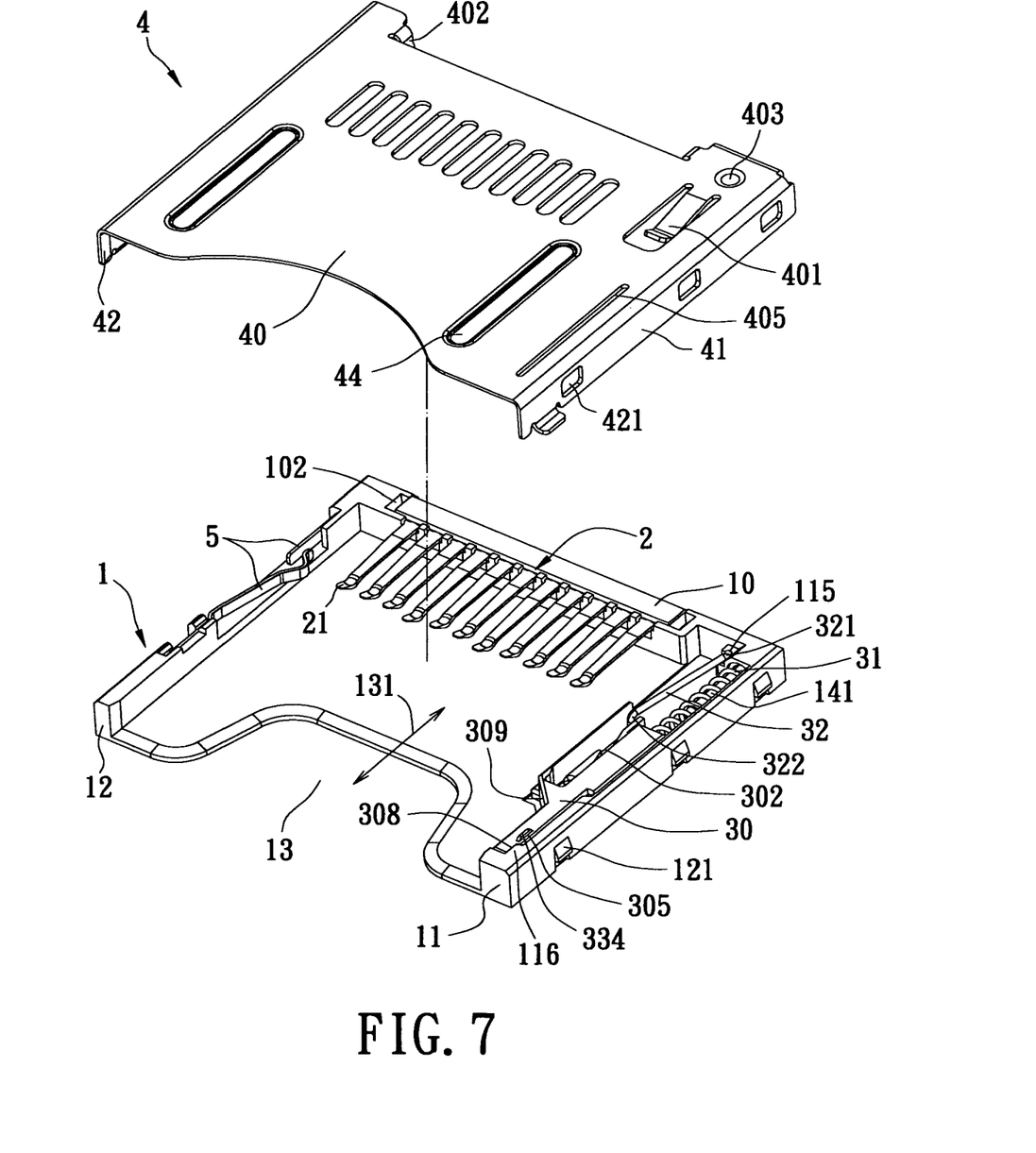
FIG. 7 is a third perspective, assembled view of the electrical card connector of the present invention.
Figure 8:
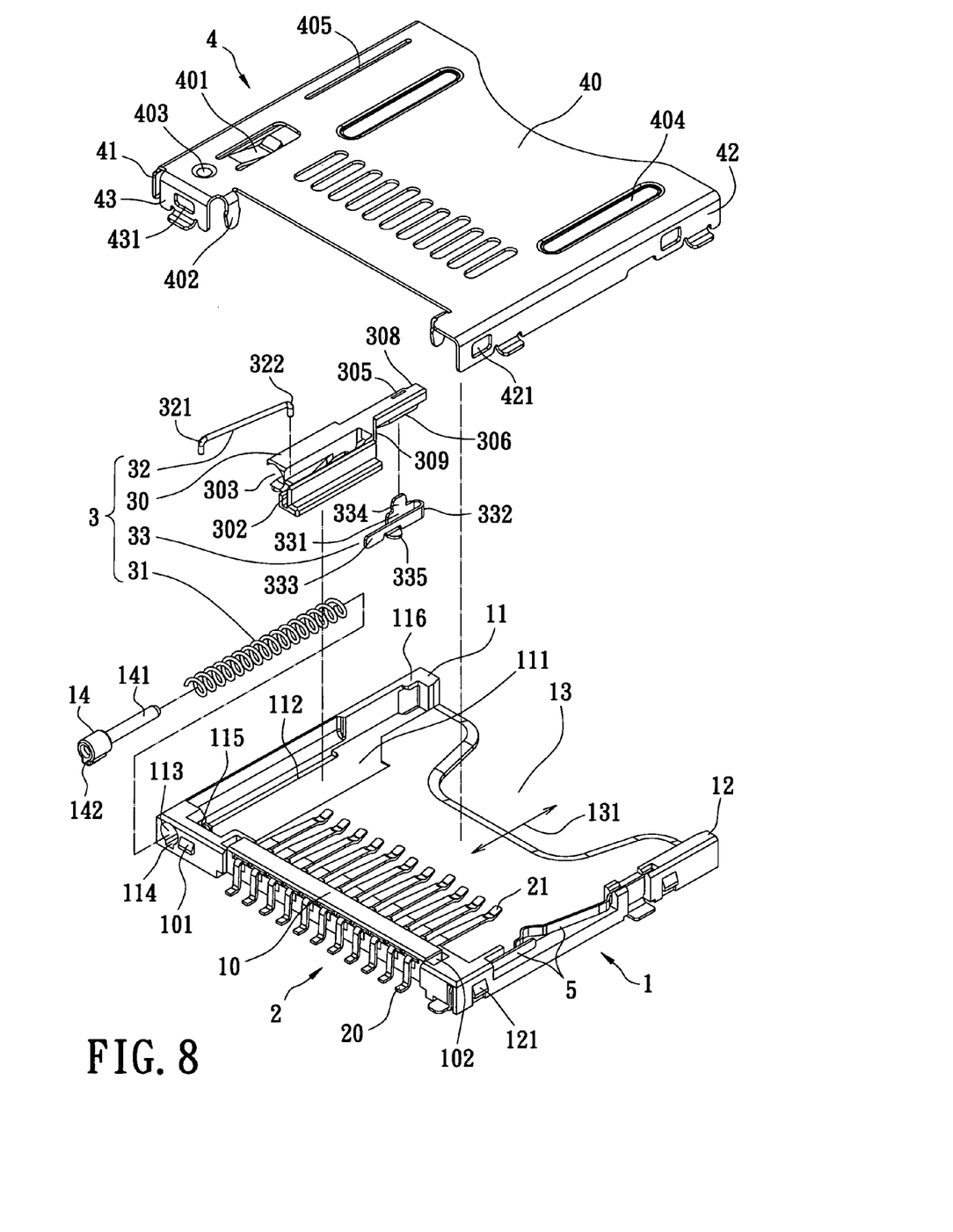
FIG. 8 is a fourth perspective, exploded view of the electrical card connector of the present invention.
Figure 9:
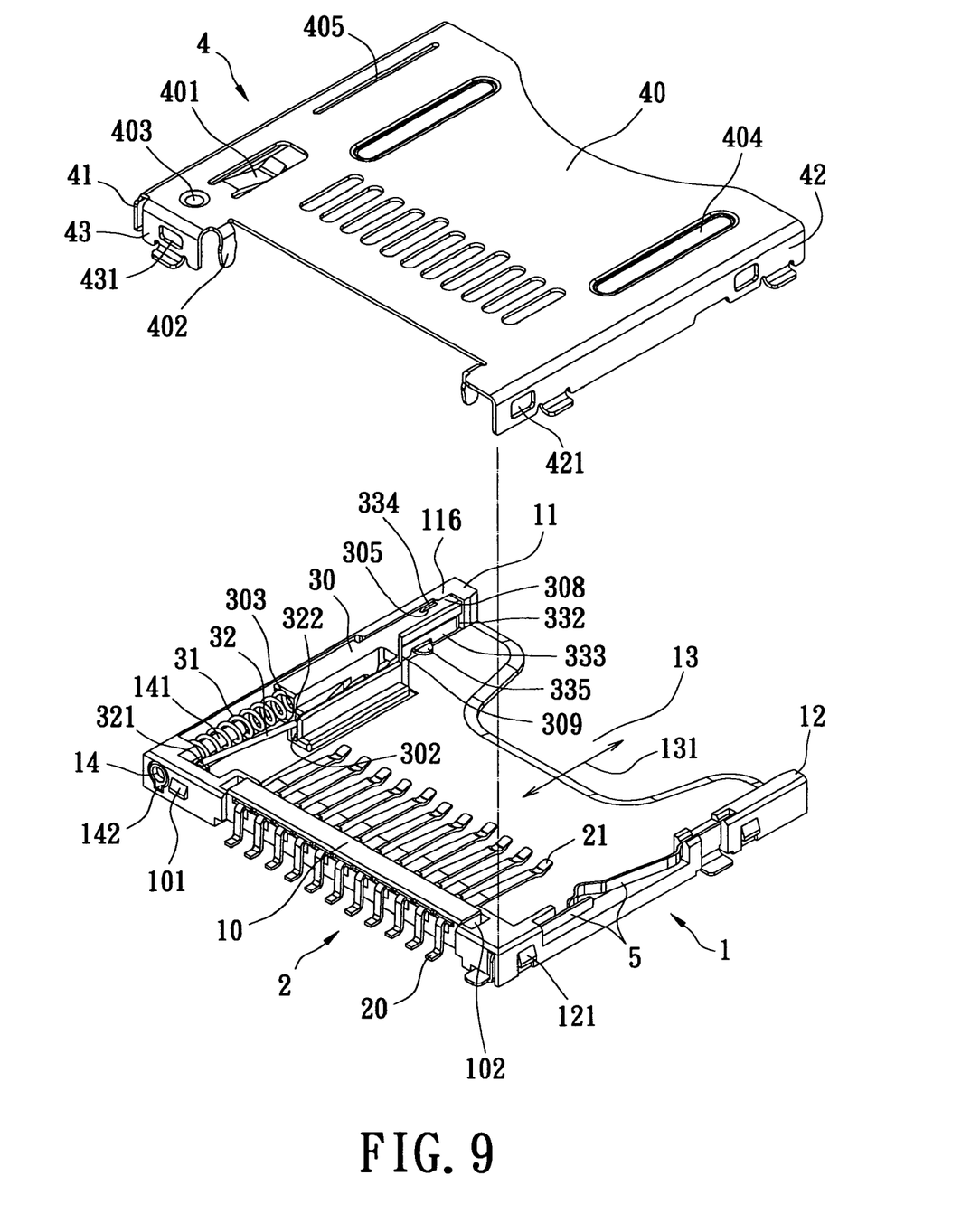
FIG. 9 is a fourth perspective, assembled view of the electrical card connector of the present invention.
Figure 11:
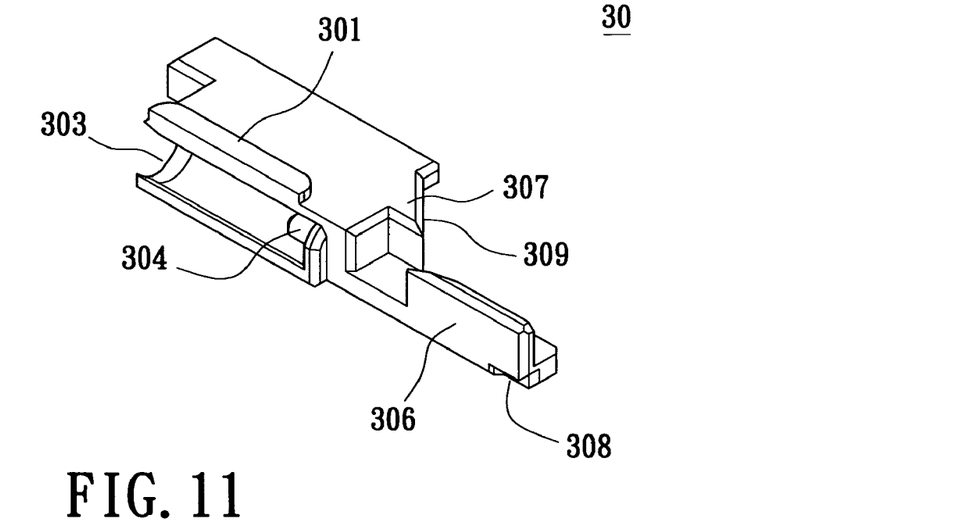
FIG. 11 is another perspective view of the sliding element of the ejector according to the present invention.

Referring to FIGS. 2 and 11, the present invention provides an electrical card connector for receiving an electronic card. The electrical card connector includes an insulative housing 1, a conductive terminal 2, an ejector 3 and a shield casing 4.

The insulative housing 1 has a base portion 10, a first arm 11 and a second arm 12. The first arm 11 and the second arm 12 are connected parallel to two sides of the base portion 10, respectively. The insulative housing further includes an insertion space 13 formed therein. The base portion 10 of the insulative housing 1 has a receiving hole 102 formed on a top face thereof, and a positioning block 101 disposed on an outside face thereof. The first arm 11 and the second arm 12 have two positioning blocks 121 disposed on an outside face thereof, respectively. The fist arm 11 has a sliding area 111 with a guiding groove 112 formed on an inside face thereof. The sliding area 111 is communicated with the insertion space 13. The guiding groove 112 is parallel to a moving path 131. The first arm 11 has a pivot hole 115 formed on a top face of a rear side thereof, and a projected edge 116 formed on the inside face of a front side thereof. The insulative housing 1 further includes a rod element 14, which has a first rod portion 141 disposed at a rear side thereof and a projected side 142 disposed at a front side thereof. The first arm 11 further has an installed hole and a concave groove 114 formed at the rear side thereof, respectively. The installed and the concave groove 114 are communicated to each other. The rod element 14 is received in the installed hole 113, and the projected side 142 is retained in the concave groove 114.

The conductive terminal 2 is arranged on the base portion 10 of the insulative housing 1. The conductive terminal 2 has a soldering side 20 and a contacting side 21 formed at two sides thereof. The soldering side 20 is disposed at an outside of the base portion 10, and the contacting side 21 is disposed at an inside of the base portion 10.

Figure 10:
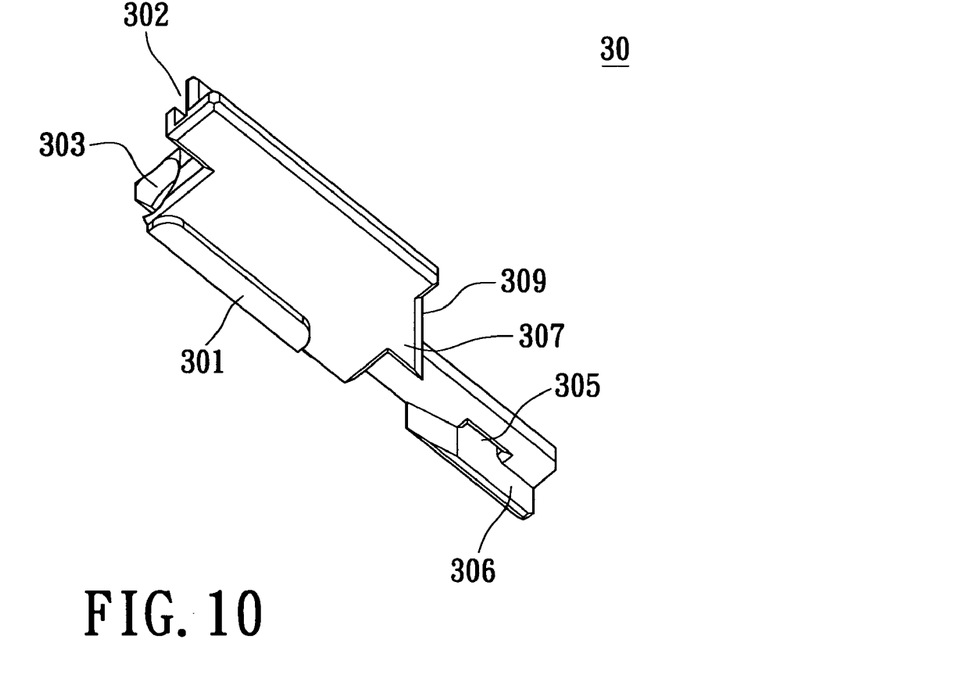
FIG. 10 is a perspective view of the sliding element of the ejector according to the present invention.

The ejector 3 includes a sliding element 30, an elastic element 31 and a guiding element 32. Referring to FIGS. 10 and 11, the sliding element 30 has a guiding block 301 projected from a bottom side thereof. The guiding block 301 is rectangular in this embodiment. The guiding block can be a square or any other kind of shape. The guiding block 301 slides in the guiding groove for the sliding element 30 sliding in the sliding area 111 of the insulative housing 1. The sliding element 30 further has a retaining wall 306 and a retaining edge 307 formed at the bottom side thereof. The sliding element has a through hole 305 penetrated through the bottom side and a top side thereof. The ejector 3 further includes an auxiliary terminal 33, which has a support portion 331, a bending portion 332 and an elastic arm 333 connected to each other. The support portion 331 contacts against to the retaining wall 306 of the sliding element 30, and has a guiding piece 334 penetrated through the through hole 305 of the sliding element 30. The elastic arm 333 has an inner bend piece 335 which inserts into the insertion space 13 of the insulative housing. The elastic arm 333 has a free end contacting against the retaining edge 307 of the sliding element 30 for the auxiliary terminal 33 fixing onto the sliding element 30. The sliding element 30 has a track groove 302 formed on a top face thereof, a pushed face 309 received in the insertion space 13 in an inclined direction, and a notch 308. The projected edge 116 and the notch 308 are matched to each other to make them more reliable. The sliding element 30 has an installed groove 303 formed at an outside thereof, and a second rod 304 installed in the installed groove 303. The elastic element 31 is installed in the first arm 11 through the installed hole 113, then the rod element 14 is fixed in the installed hole 113 for the first rod portion 141 and the second rod portion 304 receiving in two sides of the elastic element 31, and the two sides of the elastic element 31 respectively contact against the rod element 14 and the sliding element 30. This arrangement makes it easy to assemble the elastic element in the insulative housing 1 and prevents the elastic element from springing out. The guiding element 32 has a pivot side and a guiding side formed at two sides thereof, respectively. The pivot side 321 is connected pivotally to the pivot hole 115 of the insulative housing 1, and the guiding side 322 is received movably in the track groove 302 of the sliding element 30.

The shield casing 4 is coved on the insulative housing 1, and includes a top board 40, two lateral boards 41, 42 and a rear board 43. The top board 40 has a retaining piece 401, an inserting piece 402, a concave point 403 and a concave portion 404. The inserting piece 402 is positioned in the receiving hole 102 of the base portion 10. The retaining piece 401 contacts against a top side of the guiding side 322. The concave point 403 contacts against a top side of the pivot side 321. The concave portion 404 with a guiding angle (not shown) is received in the insertion space 13. The top board 40 has a guiding track 405 parallel to the guiding groove 112 of the insulative housing 1. The guiding piece 334 of the auxiliary terminal 33 is disposed slidably in the guiding track 405. The two lateral boards 41, 42 have two positioning holes 421 corresponding to the two positioning blocks 121, respectively. The two positioning blocks 121 are clamped in the corresponding two positioning holes 421. The rear board 43 has a positioning hole 431 corresponding to the positioning block 101. The positioning block 101 is clamped in the corresponding positioning hole 431. The rear board 43 covers the installed hole 113 of the first arm 11.

When the electronic card is inserted into the insertion space 13, one side of the electronic card pushes the pushed face 309 of the sliding element 30 to move, and presses the elastic element 31 at the same time for fixing the guiding side 322 in the track groove 302. When the electronic card is pushed again, the guiding side 322 is released and the elastic element 31 pushes the sliding element 30.

Because the guiding block 301 of the sliding element 30 is received slidably in the guiding groove 112 of the insulative housing 1, the sliding element is moved smoothly into the guiding groove 112 and the electronic card can be inserted smoothly into the insulative housing 1 or ejected smoothly from the insulative housing 1. The guiding piece 334 of the auxiliary terminal 33 is installed in the guiding track 405 of the shield casing 4 for increasing the reliability of the sliding element 30. The retaining piece 401 and the concave point 403 contact against the guiding side 322 and the pivot side 321, respectively, for positioning the sliding element 30. The concave portion 404 of the shield casing 4 contacts against the electronic card for guiding the electronic card to insert firmly into the electrical card connector, and increasing the conductivity between the electronic card and the conductive terminal 2.

The electrical card connector further includes a detecting terminal 5 arranged on the first arm 12 of the insulative housing 1 for detecting the electronic card which may be electrically connected to the conductive terminal.

Figure 12:
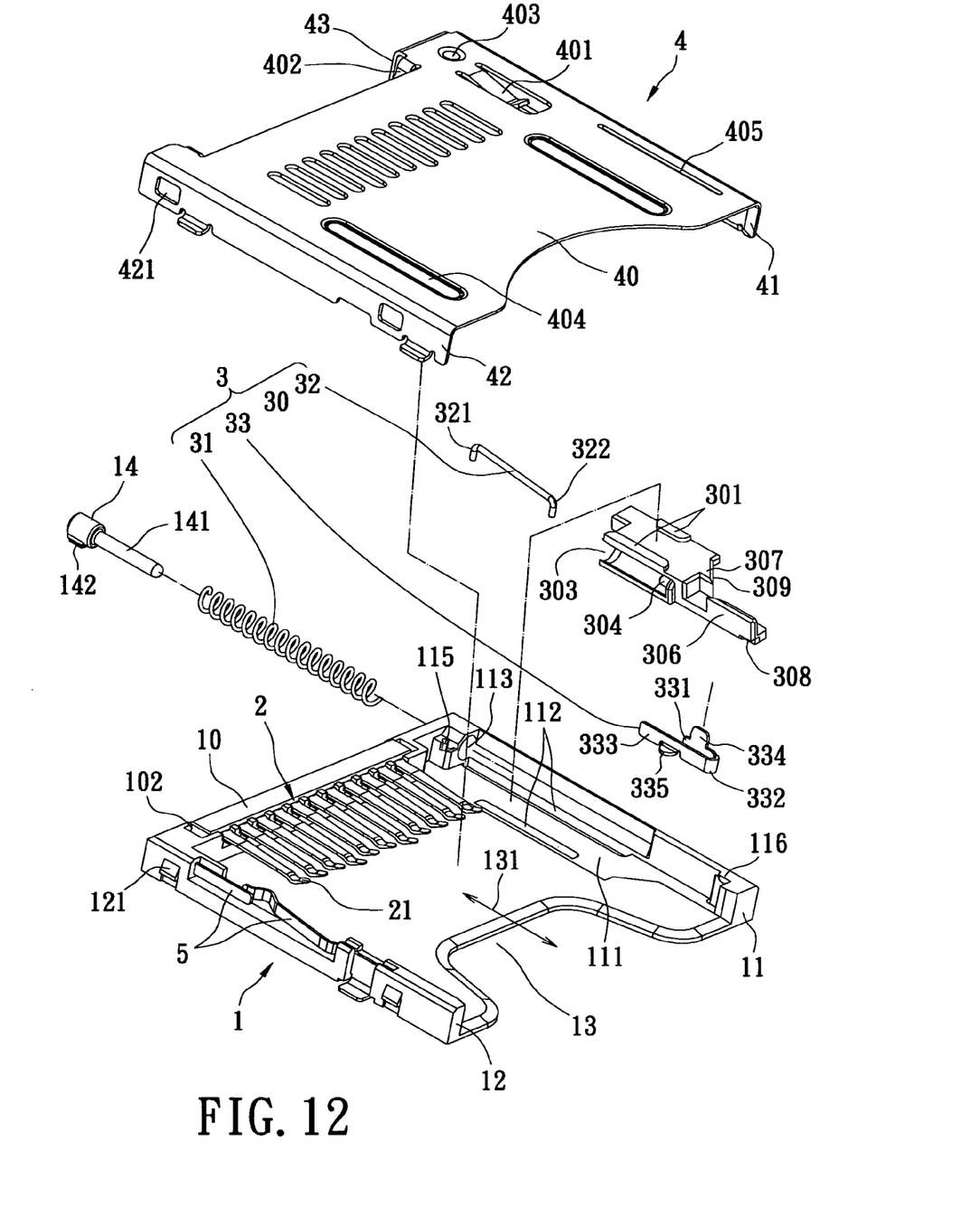
FIG. 12 is a perspective, exploded view of the electrical card connector according to another embodiment of the present invention.

Referring to the FIG. 12, the insulative housing 1 further comprises two guiding grooves 112 parallel to each other. The sliding element 30 of the ejector 3 further comprises two guiding blocks 301 projected from a bottom side thereof, and the two guiding blocks 301 are parallel to each other. The two guiding blocks 301 are installed slidably in the two corresponding guiding grooves 112 for the sliding element 30 sliding smooth in the insulative housing 10.

To sum up, the present invention has the following advantages:

1. The guiding block 301 of the sliding element 30 is received slidably in the guiding groove 112 of the insulative housing 1, the sliding element can be moved smoothly into the guiding groove 112 and the electronic card can be inserted smoothly into the insulative housing 1 or ejected smoothly from the insulative housing 1.

2. The concave portion 404 of the shield casing 4 contacts against the electronic card for guiding the electronic card to insert firmly into the electrical card connector, thereby increasing the conductivity between the electronic card and the conductive terminal 2.

3. The guiding piece 334 of the auxiliary terminal 33 is installed in the guiding track 405 of the shield casing 4 for increasing the reliability of the sliding element 30.

4. The retaining piece 401 and the concave point 403 contact against the guiding side 322 and the pivot side 321, respectively, for positioning the sliding element 30.

5. It is easy to assemble the elastic element in the installed hole by the rod element thereby improving production efficiency.

Although the present invention has been described with reference to the preferred embodiment thereof, it will be understood that the invention is not limited to the details thereof. Various substitutions and modification have been suggested in the foregoing description, and other will occur to those of ordinary skill in the art. Therefore, all such substitutions and modifications are intended to be embraced within the scope of the invention as defined in the appended claims.

What is claimed is:

1. An electrical card connector comprising:
    an insulative housing including an insertion space formed therein, and a guiding groove;
    an ejector including a sliding element and an auxiliary terminal, the sliding element having a guiding block projected from a bottom side thereof, the guiding block installed slidably in the guiding groove, the auxiliary terminal disposed slidably in the sliding element, and the auxiliary terminal having a guiding piece; and
    a electrically conductive shield casing used to cover the insulative housing, and the shield casing having a concave portion received in the insertion space, and having a guiding track parallel to the guiding groove of the insulative housing, wherein the guiding piece is installed slidably in the guiding track.

2. The electrical card connector as claimed in claim 1, further comprising a guiding groove parallel to the guiding groove of the insulative housing, and a guiding block parallel to the guiding block of the sliding element, and the two guiding blocks installed slidably in the two guiding grooves.

3. The electrical card connector as claimed in claim 1, wherein the insulative housing further comprises a base portion and a second arm, the first arm and the second arm are parallel to each other, and are respectively connected to two sides of the base portion, and the guiding groove is formed on an inside side of the first arm.

4. The electrical card connector as claimed in claim 1, wherein the sliding element has a pushed face formed in an inclined direction.

5. The electrical card connector as claimed in claim 3, further comprising a plurality of conductive terminals, wherein each of the conductive terminals is arranged on the base portion of the insulative housing, and has a soldering side and a contacting side respectively formed at two sides thereof, wherein each of the soldering sides is arranged on an outside of the base portion, and each of the contacting sides are arranged in the insertion space.

6. The electrical card connector as claimed in claim 3, wherein the first arm further comprises a sliding area formed on an inside thereof, the sliding area is communicated to the insertion space, and the sliding element of the ejector is received slidably in the sliding area.

7. The electrical card connector as claimed in claim 3, wherein the first arm has a projected edge formed on the inside face of a front side thereof, and the sliding element has a notch matched with the projected edge for increased reliability.

8. The electrical card connector as claimed in claim 1, wherein the shield casing includes a top board having a retaining piece and the ejector includes a guiding element, wherein the guiding element has a pivot side formed at one side thereof and a guiding side formed at opposite side thereof, wherein the sliding element has a track groove, the pivot side is pivoted to the insulative housing and the guiding side is received movably in the track groove, and the retaining piece contacts against a top side of the guiding side.

9. The electrical card connector as claimed in claim 8, wherein the top board has a concave point for contacting against a top side of the pivot side.

10. The electrical card connector as claimed in claim 1, wherein the shield casing includes a top board having a concave portion.

11. The electrical card connector as claimed in claim 10, wherein the concave portion has a guiding angle.

12. The electrical card connector as claimed in claim 1, wherein the sliding element of the ejector has a through hole, and the guiding piece of the auxiliary terminal is used to penetrate through the through hole of the sliding element.

13. The electrical card connector as claimed in claim 12, wherein the sliding element of the ejector has a retaining wall and a retaining angle, and the auxiliary terminal has a support portion, a bending portion and an elastic arm, wherein the support portion contacts against the retaining wall of the sliding element, the elastic arm has an inner bend piece is inserted into the insertion space of the insulative housing, and the elastic arm has a free end contacted against the retaining edge of the sliding element for the auxiliary terminal to fix onto the sliding element.

* * * * *